Patented Oct. 13, 1942

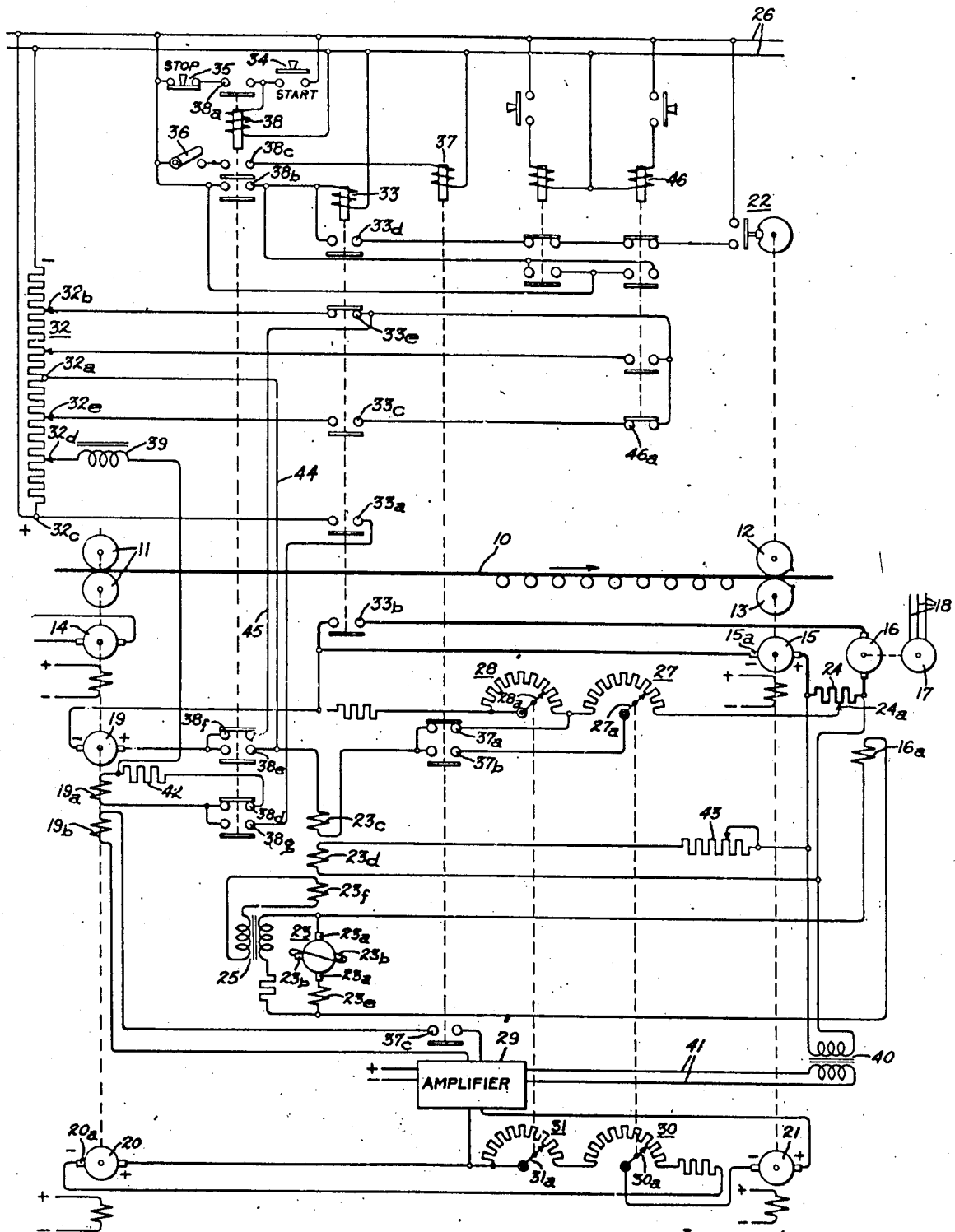

2,298,877

UNITED STATES PATENT OFFICE 2,298,877

CONTROL SYSTEM

Martin A. Edwards, Scotia, and Francis Mohler, Schenectady, N. Y., assignors to General Electric Company, a corporation of New York Application March 22, 1941, Serial No. 384,718

11 Claims. (Cl. 172—239)

This invention relates to control systems, more particularly to systems for controlling the acceleration, running and deceleration of an electric motor, and it has for an object the provision of an improved, simple, reliable and inexpensive control system of this character.

The invention also relates to a control system for matching the speeds of two or more motors, and a further object of the invention is the provision of a highly accurate regulating control system of this character.

In carrying the invention into effect in one form thereof, means are provided for producing a control voltage proportional to the speed of a first electric motor, and means are provided for producing a voltage proportional to the speed of a second electric motor. A dynamoelectric machine is provided with a control field winding which is connected to be responsive to these voltages, and this dynamoelectric machine controls the speed of one of the motors so as to bring about and maintain a predetermined speed relationship between the two motors.

In a specific embodiment of the invention, a pilot generator driven by the motor whose speed is to be used as the reference speed is provided for producing the voltage which is proportional to this reference speed, and the control field winding of the dynamoelectric machine is energized in accordance with the difference of the reference speed voltage and a voltage which is proportional to the speed of the controlled motor.

An added feature of the invention is the provision of a fine or vernier control. This feature embodies means such, for example, as tachometer generators driven by the reference speed motor and the controlled motor for producing control voltages proportional to the speeds of the motors, together with means responsive to the difference of these voltages for modifying the excitation of the pilot generator driven by the reference speed motor.

The means for modifying the excitation of the pilot generator is preferably a vacuum tube amplifier connected to be nonconducting when the speed of the controlled motor is less than a predetermined value relative to the speed of the reference speed motor, and to become conducting when the speed of the controlled motor equals or exceeds the desired value relative to the speed of the reference speed motor.

In illustrating the invention in one form thereof, it is shown as embodied in a control system for a flying shear. The operating requirements of a flying shear with respect to speed and accuracy are unusually rigid and for this reason the application of the invention to a flying shear is well adapted to illustrate the novel and useful operating characteristics of the invention.

A flying shear usually comprises two rotating drums each equipped with a knife, and it is used for cutting either hot or cold steel strips. Thus a flying shear may follow a hot strip mill, a cold strip mill, or a processing line. The following description is based on the use of a flying shear in connection with a hot strip mill.

A hot strip mill comprises a series of mill stands, and the flying shear is placed immediately following the last stand, which is known as the finishing stand.

One of the requirements of a flying shear is the cropping of the front end of the strip at a predetermined distance from the end and then shearing the strip to length. These lengths may vary from 15 to 30 feet or more. In order to crop the front end of the strip, the shear must accelerate very rapidly and also very accurately in order to make a consistent front end crop at a predetermined distance from the front end of the strip.

After cropping the front end, the shear runs at a constant speed, and makes a length of cut dependent upon the relative speeds of the shear knives and the strip. Thus for a given strip speed, a definite speed of the shear knives will effect a definite length of cut. If the shear speeds up, the cut will be shorter and if the speed of the shear decreases, the cut will be longer.

Heretofore, flying shears have generally used an adjustable hydraulic gear for connecting the flying shear to the last stand of the mill. Although this type of mechanical tie between the mill and the shear has given good results, it has also left much to be desired from the point of view of accuracy and flexibility.

Accordingly, a further object of this invention is the provision of means for eliminating the mechanical gear tie between the shear and the last stand of the mill, and to provide in its stead a highly accurate, purely electrical tie.

The accuracies required are of the order of three-tenths of an inch in a 30-foot length cut. In other words, the accuracy desired is approximately one-tenth of one per cent. An accuracy of one per cent is of course not required in all cases, but in general this figure is of the order of the accuravy that is usually required and it illustrates the high degree of accuracy required in systems of this character.

In order to have a range of 2:1 in length of cut, it should be possible to adjust the flying shear over a 2:1 speed range for any particular strip speed, and then accurately to maintain this speed relationship. In addition, the delivery or strip speed may vary over a range of 2:1 and the flying shear should accurately follow any changes in the strip speed.

Another operation of a flying shear is the cropping of either end or both of the strip without intermediate cutting to length. In cropping the front end, the shear is started so that it will cut after a few feet of the end of the strip have passed through the shear. The shear must then be decelerated very rapidly to prevent making a second cut. In cropping the tail end, the shear must accelerate to synchronous speed of the strip in less than the length of one cut, or otherwise a premature cut would be made.

Thus it is obvious that for shearing, extremely accurate speed control is required and for cropping, very rapid acceleration and deceleration are required. Likewise, to crop uniformly a predetermined distance from the end of the strip, the acceleration of the shear must be very uniform.

For a better and more complete understanding of the invention, reference should now be had to the following specification and to the accompanying drawing, the single figure of which is a simple, diagrammatical illustration of an embodiment of the invention.

Referring now to the drawing, a length of material 10, such for example as a strip of hot steel, is delivered from the finishing rolls 11 of the last stand of a rolling mill and is passed between the upper and lower drums 12 and 13, respectively, of a flying shear. The finishing rolls 11 of a rolling mill are illustrated as being driven by a direct current motor 14, although they might be driven by any other suitable driving means. The shear drums 12 and 13 are illustrated as being driven by means of a direct current electric motor 15 which is supplied from an adjustable voltage generator 16, which, in turn, is driven by suitable means illustrated as an alternating current induction motor 17 supplied from a suitable source of power represented by the three supply lines 18. Frequently in practice, flying shears for hot strips are driven by two motors in parallel in order to reduce the inertia and thereby to obtain the necessary accelerating torque. However, for the purposes of simplicity, the driving means are herein illustrated as the single direct current motor 15.

It will be noted that the flying shear is indicated in its initial predetermined position ready to start a cropping operation. With the knives in this position, the maximum time is available for accelerating the flying shear before the cut is made.

Geared to the roll driving motor 14 are a small stand pilot generator 19 and a small stand pilot tachometer generator 20. These generators produce control voltages which are proportional to the speed of the motor 14 and therefore proportional to the speed of the strip 10. These voltages are used in the control system as reference speed voltages for matching the speed of the motor 15 with the speed of the motor 14. The term "matching" as used herein is to be understood as maintaining a predetermined speed relationship between the two motors.

A pilot tachometer generator 21 is geared to the shear motor 15 so as to be driven thereby and to produce a voltage proportional to the speed thereof. The voltage of the shear pilot tachometer generator 21 is used in the control system to compare the speed of the motor 15 with the speed of the motor 14. A limit switch 22 is also driven by the shear motor 15. This limit switch makes one revolution for each cut of the shear blades.

The shear motor supply generator 16 is provided with a field winding 16a and the excitation for this winding is supplied from a suitable dynamoelectric machine which preferably is an armature reaction excited dynamoelectric machine 23.

The dynamoelectric machine 23 is driven by any suitable means such as an alternating current induction motor (not shown) at a speed which is preferably substantially constant. The dynamoelectric machine 23 has two sets of brushes. One set of brushes 23a is connected to the external load which in this case is the separately excited field winding 16a of the supply generator 16. The other set of brushes 23b is short-circuited. The axis of the flux which is produced by the current flowing in the short-circuited armature conductors is referred to as the short-circuit axis, and the axis which is displaced 90 electric degrees from the short-circuit axis is referred to as the control axis. If it be assumed that the axis of brushes 23b coincides with the short-circuit flux axis, then the load brushes 23a are on the control axis. The net flux along the control axis is produced by two opposing control field windings 23c and 23d, a series compensating field winding 23e, and the armature reaction of the load current. It is to be noted that the field winding 23d is connected to be energized by the voltage drop across the line resistor 24 which is connected in series relationship between the supply generator 16 and the shear motor 15. In other words, the control field winding 23d is energized in accordance with the current exchanged between the supply generator and the shear motor. The flux along the short-circuit axis of the dynamoelectric machine 23 is produced by the armature reaction of the short-circuit current. If desired, a portion of this flux may be produced by a shunt field winding (not shown). The short-circuit axis flux generates the voltage which appears across the load brushes 23a, and the control axis flux produces the voltage which appears across the short-circuited brushes 23b and causes the short-circuit current to flow.

The operation of the machine 23 will be readily understood by considering the operation without the second control field winding 23d, and the compensating field winding 23e, and then subsequently considering the effect of these fields on the operation.

Voltage may be applied to the voltage control field winding 23c and current begins to build up in this field winding. Immediately there is generated a voltage in the short circuit path which circulates a large current in the short circuit.

Since the resistance of the short circuit is so low as to be almost negligible, the control field winding 23c is only required to produce a very small flux in order to produce a large current in the short circuit and a correspondingly large armature flux. Furthermore, since the flux of the control field winding need only build up to such a low value, and since the resistance and reactance of the short-circuited armature path are very low, full load current in the short circuit will be obtained in an exceptionally short time. The armature reaction flux produced by the short-circuit current generates a voltage across the load brushes 23a and causes load current to flow. This load current will produce an armature flux which opposes the flux of the control field winding 23c. This would, of course, mean that the flux of the control field winding 23c would have to be large enough to overpower this control axis armature flux. However, by using a series field winding 23e through which the load current passes, the armature reaction on the control axis can be substantially completely neutralized. Thus by the use of this series compensating field winding 23e, the control field is only required to produce enough field flux and voltage to overcome the resistance drop in the short circuit, and accordingly, the time constant or rate of response is very fast.

As pointed out in the foregoing, the two control field windings 23c and 23d oppose each other. The control field 23c is arranged to be connected to be responsive to the difference of a voltage of the pilot generator 19 and a voltage which is approximately proportional to the speed of the shear motor 15. Field winding 23c causes the machine 23 to increase the voltage on the generator 16, and the field winding 23d which is excited by the armature current of shear motor 15 causes the machine 23 to tend to reduce the voltage of the machine 23 and generator 16.

An anti-hunting field 23f is also provided on the control axis of the machine 23. It is energized from the secondary of a transformer 25 whose primary winding is connected across the armature load brushes 23a.

A constant source of voltage is supplied to the buses 26 from a suitable source such for example as an exciter (not shown).

The basic operations for controlling acceleration, deceleration, and speed matching of the motors 14 and 15 are accomplished by utilizing the dynamoelectric machine 23 to regulate the voltage applied to the shear motor 15 but with a current limit.

To this end, a potentiometer rheostat 27 is connected across the armature terminals of the shear motor 15 in such a manner that the voltage between the negative terminal 15a of the shear motor 15 and the contact arm 27a is proportional to the desired length of cut. In other words, with the contact arm at the left-hand terminal of the rheostat 27, the shear motor supply generator 16 would have to go to maximum voltage in order to match the voltage of the stand pilot generator 19. This would be the condition for the shortest cut. On the other hand, with the contact arm 27a on the right-hand terminal of the rheostat 27, the shear generator would only have to go to a very considerably lower voltage in order to match the stand pilot generator voltage. For a 2:1 range in length of cut, it would be necessary for this rheostat to provide a 2:1 range of voltage. The rheostat 27 is hereinafter referred to as the length of cut rheostat. In series with the length of cut rheostat is a rheostat 28 hereinafter referred to as the roll diameter compensating rheostat. Rolls of various diameters are used on the finishing stand and this of course causes the strip speed to vary for the same stand pilot generator voltage. Accordingly, when the rolls of one diameter are changed for the rolls of a different diameter, a correction must be made in order to recalibrate the length of cut rheostat 27.

The stand pilot tachometer generator 20 and the shear pilot tachometer generator 21 are utilized to produce the fine or vernier control. In producing this vernier control, a direct current vacuum tube amplifier 29 is used, the input of which is dependent upon the difference in voltage between the stand pilot tachometer generator 20 and the shear pilot tachometer generator 21. In this vernier control, a length of cut rheostat 30 and a roll diameter compensating rheostat 31 are employed. The movable contacts 30a and 31a of these rheostats are mechanically coupled to the movable contact arms 27a and 28a of the corresponding rheostats in the coarse control as indicated in the drawing by the dotted line connections. The length of cut rheostat 30 is calibrated so as to give the exact speed required for the length of cut desired. Since the direct current vacuum tubes of the amplifier 29 are one-way current devices, or rather rectifiers, the amplifier 29 will not pass current as long as the shear pilot tachometer generator 21 is below the desired speed. In other words, the potential drop between the negative terminal of the stand pilot tachometer generator 20 and the contact arm of the length of cut rheostat 30 is greater than the potential drop across the shear pilot tachometer generator when the shear is below the desired speed. The result of this is to tend to force current through the tube amplifier in the wrong direction, and thus, during this time no current passes through the tube amplifier.

The length of cut rheostat 27 in the coarse control is so calibrated that it tends to cause the shear motor 15 to run at a speed that is substantially 10 per cent greater than the desired speed.

A control potentiometer 32 is connected across the source 26. This potentiometer is provided with a plurality of voltage dividing taps to provide various controlling functions.

A line contactor 33 illustrated as an electromagnetic switching device under the control of a start switching device 34 and a stop switching device 35 serves to complete and to interrupt the connections between the supply generator 16 and the shear motor 15.

In actual practice an accurate timing control is provided for closing a contact in parallel with the contacts of the switch 34 for initiating the cropping operation and also to open contacts in series with the stop control switching device 35 to initiate deceleration after the completion of the cropping operation. However, since the timing control utilized for this purpose constitutes no part of the present invention, the start control switching device 34 and the stop control switching device 35 are illustrated simply as manually operated type push button switches.

A switching device 36 and an electromagnetic contactor 37 controlled thereby control the operation of cutting to length. More specifically, contactor 37 controls the cutting in and cutting out of the length of cut rheostat 27 and also the cutting in and cutting out of the vacuum tube amplifier 29.

With the foregoing understanding of the elements and their organization, the operation of the complete system itself will readily be understood from the following detailed description: In the following description, it is assumed that the finishing stand motor 14 is energized and is driving the finishing rolls 11 so that the finished strip is being delivered to the flying shear drums 12, 13 at a substantially constant speed.

The shear is started by depressing the movable contact member of the start push button switch 34 to bridge the stationary contact and thereby complete an energizing circuit for the operating coil of starting contactor 38. As a result of its energization, contactor 38 closes its upper contacts 38a to provide a sealing-in circuit through the normally closed contacts of stop push button 35. Simultaneously, contactor 38 closes its contacts 38b to provide an energizing circuit for the line contactor 33. Contacts 38c in closing partially complete an energizing circuit for the operating coil of the length of cut control contactor 37 so that when the switching device 36 is subsequently closed, contactor 37 is energized and is picked up to open its normally closed contacts 37a and to close its normally open contacts 37b and 37c. In the closed position of contactor 38, normally closed contacts 38d are opened to interrupt the discharge circuit for the field winding 19a of the pilot generator 19, and normally open contacts 38e are closed so as to connect the voltage control field winding 23c of the dynamoelectric machine 23 to the length of cut rheostat 27 and to the armature of the pilot stand generator 19. As a result, a control voltage is applied to the voltage control field winding 23c which is equal to the difference of the voltage of the pilot generator 19 and the voltage between the movable contact arm 27a of the rheostat 27 and the negative terminal 15a of the shear motor 15. The length of cut rheostat 27 has of course been previously preset for the desired length of cut and as previously mentioned, rheostat 27 is calibrated so that when preset for a speed corresponding to a desired length of cut, the coarse control actually tends to accelerate the shear motor to a speed substantially 10 per cent greater than the desired speed. Simultaneously, normally closed contacts 38f are opened thereby to disconnect the voltage control field winding 23c from the potentiometer resistor 32. Prior to the opening of contacts 38f the voltage between the points 32a and 32b of the potentiometer resistor was applied across the contacts 38e thereby causing current to flow in the control field winding 23c, and as a result, the dynamoelectric machine 23 energizes the field winding 16a so that the supply generator 16 was generating a very substantial voltage when contacts 38e were closed to connect the voltage control field winding 23c to the stand pilot generator 19 and the length of cut rheostat 27. Thus at the instant of closing of the line contactor 33, a voltage is available on the supply generator 16 which will give the maximum desired accelerating current for the shear motor 15 immediately. Contacts 38g, in closing, connect the field winding 19a of the stand pilot generator 19 to the points 32c, 32d of the potentiometer 32 with the reactor 39 included in series relationship in the circuit. Thus excitation is applied to the stand pilot generator 19. This excitation, however, does not build up immediately because the reactor 39 limits the rate of rise of current in the field winding 19a. As the excitation builds up, the stand pilot generator voltage builds up applying an excitation to the voltage control field winding 23c of dynamoelectric machine 23 in such a direction that the voltage at the brushes 23a rises. This increasing voltage in turn raises the excitation of the shunt field winding 16a of the supply generator 16 and thereby increases the voltage applied to the shear motor 15. This process continues until the voltage between the negative terminal 15a of the shear motor 15 and the contact arm 27a of the length of cut rheostat 27 nearly equals the voltage of the stand pilot generator 19. If the voltage between the terminal 15a and the contact arm 27a became exactly equal to the voltage of the stand pilot generator 19, the excitation of the control field winding 23c would become zero and likewise the voltage of the generator 16 would become zero. However, the acceleration of the shear motor 15 does continue until a balanced condition is established in which the net excitation on the control field axis of the dynamoelectric machine 23 is just sufficient to cause the motor 15 to operate continuously at the speed determined by the setting of rheostat 27.

If during this acceleration, the armature current of the shear motor 15 tends to become excessive, the current limit control field winding 23d will be energized from the line resistor 24 in series with the shear motor armature in such a manner as to oppose the voltage control field which is causing the acceleration. Thus a current limit is imposed during acceleration.

If it were not for the vernier control, the shear motor would accelerate to a speed of 10 per cent faster than the desired speed, because of the calibration of the length of cut rheostat 27, as mentioned in the foregoing. While the shear motor 15 is being accelerated to the desired speed, the voltage drop between the negative terminal 20a of the stand pilot tachometer generator 20 and the contact arm 30a of the length of cut rheostat 30 is greater than the voltage drop across the shear pilot tachometer generator 21 and tries to force current through the tube amplifier 29 in the wrong direction. Consequently, during the acceleration no current passes through the tube amplifier. However, the instant that the voltage of the shear pilot tachometer generator 21 becomes the greater, the tube amplifier will pass current and the output of this amplifier will excite the field winding 19b of the stand pilot generator 19. The connections between the tube amplifier 29 and the field winding 19b are such that the excitation of the field winding 19b is differential with respect to the excitation of field winding 19a, with the result that the voltage of the pilot generator 19 is reduced. The lower the stand pilot generator voltage, the lower also will be the voltage across the terminals of the shear motor 15 at which the balanced condition results. Consequently, when the tube amplifier 29 conducts current, the stand pilot generator 19 actually is recalibrated in such a manner as to hold the exact speed desired as determined by the length of cut rheostat 30 of the fine control and the shear pilot tachometer generator 21. The tube amplifier 29 has a high degree of sensitivity. For example, the sensitivity is preferably such that a variation of 0.1 volt on the input will cause full change in the output. The number of turns of the auxiliary field winding 19b is such that full change in the output of the tube amplifier 29 will produce a change in the speed of the shear motor 15 of a substantial amount, e. g. 15 to 20 per cent. Thus the pilot tachometer generators 20 and 21 together with the tube amplifier 29 constitute a highly accurate vernier speed control. The length of cut rheostat 30 in the vernier control actually determines the length of cut to be maintained, and it is therefore not necessary to calibrate accurately the length of cut rheostat 27 of the coarse control as long as it tends to cause the shear motor 15 to run at a speed higher than the actual desired speed. Since the tube amplifier 29 is preferably a simple conventional two-stage amplifier of the high vacuum or "hard" tube variety, it can be arranged so that it will operate with a zero bias, i. e., it can be arranged so as to require practically no current from the pilot tachometer generators. This is very important since the operation is dependent upon voltage division and is therefore not subject to errors owing to changes in the resistance of the potentiometer 30. The roll diameter compensation rheostat 31 does affect the voltage, but since this is a small portion or rather percentage of the length of cut rheostat 30, such inaccuracies will be insignificant.

It is usually found that highly sensitive speed regulating systems such as the tube amplifier vernier control system disclosed herein are subject to hunting. Accordingly, the tube amplifier 29 is provided with an anti-hunt transformer 40, the primary winding of which is connected across the line resistor 24 and the secondary winding of which is connected by means of conductors 41 to the tube amplifier 29.

To stop the shear, the push button switch 35 is depressed to open its normally closed contacts. As pointed out in the foregoing, when automatic timing control is used, contacts in series relationship with the switch 35 will be opened by the automatic timing control. Opening of these contacts interrupts the energizing circuit of the start contactor 38. In response to deenergization, contactor 38 opens its normally open contacts 38b, 38c, 38e, and 38g and closes its normally closed contacts 38d and 38f. Contacts 38g in opening disconnect the field winding 19a of the stand pilot generator 19 from the potentiometer 32, and contacts 38d in closing complete a discharge circuit for this field winding through the resistor 42. As a result, the stand pilot generator voltage decays and the rate of decay is dependent upon the resistance of the discharge circuit. Thus, as the stand pilot generator voltage decreases below the voltage drop from the negative terminal 15a of the shear motor to the contact arm 27a of the length of cut rheostat 27, the difference between these two voltages reverses the energization of the voltage control field winding 23c, and causes the output voltage of the dynamo-electric machine 23 and the voltage of the supply generator 16 to decay. If, during deceleration, the pump back current becomes excessive in the armature of the shear motor 15, the current in the current limit control field winding 23d which has reversed, owing to the reversal of direction of current flow through the line resistor 24 is therefore in such a direction as to oppose the excitation of the voltage control field winding 23c and thereby limits the pump back current to a predetermined value. The allowable peak current during acceleration or deceleration is controlled by the current limit adjusting rheostat 43. The instant that the speed of the shear motor 15 decreases below the preset desired value, no current is passed through the tube amplifier 29 and the vernier speed tie system is entirely inactive from this point on during the remainder of the deceleration.

Contacts 38b in opening do not interrupt the energizing circuit of the line contactor 33 which remains sealed in through the contacts of the limit switch 22. Even though the voltage of the stand pilot generator 19 decreases to zero, a voltage is imposed across the contacts 38e which is opposite in polarity with respect to the voltage of pilot generator 19 when generating. This voltage is derived from the potentiometer 32 through a jumper 44 from the right-hand contact 38e to the tap 32a of the potentiometer and from the left-hand contact 38e through normally closed contacts 38f and jumper 45, normally closed contacts 46a of the forward jog contactor 46 and contacts 33c to tap 32a of the potentiometer. This voltage derived from the potentiometer 32 is relatively low, and since its polarity is opposite to the polarity of the voltage of pilot generator 19, it causes the voltage of the supply generator 16 to build up in the reverse direction and thereby reverse the direction of rotation of the shear motor 15. The reverse speed of the shear motor is determined by the magnitude of the reverse voltage derived from the potentiometer rheostat 32. When the knives on the upper and lower drums 12 and 13 of the flying shear reach the desired stopping position, the contacts of the limit switch 22 open and interrupt the sealing-in circuit of the line contactor 33, which in response to deenergization opens its normally open contacts 33a, 33b, 33c, and 33d and closes its normally closed contacts 33e.

Contacts 33c in opening remove the reverse polarity voltage applied to the field winding 23c of dynamo-electric machine 23 and contacts 33e in closing complete a circuit from the left-hand contact 38e to the tap 32b of the potentiometer so that a voltage of the same polarity as the voltage of pilot generator 19 is applied to the field winding 23c. The magnitude of this voltage is determined by the position of the movable contacts 32b on the potentiometer. As a result, the pilot generator 23 builds up and maintains a substantial voltage on the supply generator 16 so that when the line contactor 33 closes contacts 33b at the beginning of the next shearing operation, a voltage is available on the supply generator 16 to provide the desired accelerating current for the shear motor 15 immediately.

During acceleration, the armature current of the shear motor 15 may be three or four times normal current, and as synchronous speed is approached, the supply generator voltage leads the speed of the shear motor 15 by a considerable amount, owing to the voltage drop in the line resistor 24 and the shear motor armature. As a result, there is a tendency to overswing as the shear approaches synchronous speed, and then underswing, and finally settle down on the exact speed. This overshooting and undershooting is of course undesirable and can be eliminated by moving the contact 24a to the correct position on the line resistor 24, so that the length of cut rheostat 27 instead of being connected directly across the terminals of the shear motor 15 is connected across the armature of the motor 15 and a portion of the line resistor 24. The further the contact 24a is moved toward the positive terminal of the supply generator 16, the less will be the tendency for the voltage of the supply generator 16 to lead the speed of the shear motor 15, and a slow tapering off of the speed as the shear motor approaches synchronous speed is thereby obtained. In other words, the dynamoelectric machine 23 receives the signal earlier than otherwise before the desired voltage of the supply generator 16 and the speed of the shear have been reached, and stops the acceleration. The accelerating current then decays and the voltage across the shear motor 15 becomes more nearly equal to that across the generator 16.

In cropping either the front end or the tail end of the strip, or both of them, the accurate speed tie between the shear and the finishing stand of the rolling mill is not required and it is necessary merely to accelerate to a speed slightly faster than the speed of the strip and then decelerate and stop the shear in position. In this case the switch 36 is opened, which deenergizes the shear contactor 37. This disconnects the tube amplifier 29 so that the vernier speed control is inactive. The power control of acceleration and deceleration is under the control of the dynamoelectric machine 23 as described in the foregoing.

Although in accordance with the provisions of the patent statutes this invention is described as embodied in concrete form and the principle thereof has been explained, together with the best mode in which it is now contemplated applying that principle, it will be understood that the apparatus and connections shown and described are merely illustrative and that the invention is not limited thereto, since alterations and modifications will readily suggest themselves to persons skilled in the art without departing from the true spirit of this invention or from the scope of the annexed claims.

What we claim as new and desire to secure by Letters Patent of the United States is:

1. A control system comprising in combination an electric motor, means for controlling the excitation of said motor comprising a dynamoelectric machine having a control field axis, means for producing a control voltage comprising a generator having a field winding, a source of voltage, a reactance device and means for connecting said field winding to said source in series relationship with said reactance thereby to control the rate of rise of the voltage of said generator, means for producing a voltage proportional to the speed of said motor, and means responsive to said voltages for producing a net excitation along said control field axis thereby to accelerate said motor to a speed having a predetermined relationship to the voltage of said generator.

2. A control system comprising in combination an electric motor, means for controlling the speed of said motor comprising a dynamoelectric machine having a control field axis, means for producing a reference control voltage, means for producing a second voltage proportional to the speed of said motor, means responsive to both said voltages for producing a net excitation along said control axis thereby to cause said dynamoelectric machine to hold the speed of said motor constant at a value having a predetermined relationship to said control voltage, means for varying said second voltage so that said dynamoelectric machine tends to hold the speed of said motor at a value substantially greater than the desired speed value, and means responsive to the desired speed of said motor for varying said control voltage so that said dynamoelectric machine holds the speed of said motor at the desired value.

3. A control system comprising in combination, a first electric motor, means for controlling the speed of said motor comprising a dynomoelectric machine having a control field axis, a second electric motor and a pilot generator driven thereby for producing a reference control voltage proportional to the speed of said second motor, means for producing a voltage approximately proportional to the speed of said first motor, means responsive to said voltages for producing a net excitation along said control axis thereby to cause said dynamoelectric machine to accelerate said first motor, means for modifying said net excitation so that said dynamoelectric machine tends to accelerate said first motor to a speed substantially higher than the desired value, and means responsive to the desired speed relationship of said motors for varying the voltage of said generator so that said dynamoelectric machine holds the speed of said first motor constant at the desired value.

4. A control system comprising in combination, a first electric motor, means for producing a voltage approximately proportional to the speed of said motor, means for controlling the speed of said motor comprising a dynamoelectric machine provided with a control field axis, a second electric motor and a pilot generator driven thereby for producing a reference control voltage proportional to the speed of said second motor, means responsive to said voltages for producing a net excitation along said control axis to cause said dynamoelectric machine to accelerate said first motor, means for varying said first voltage so that said dynamoelectric machine tends to accelerate said first motor to a speed substantially higher than the desired speed, a tachometer generator driven by said first motor, a second tachometer generator driven by said second motor, and means responsive to the voltages of said tachometer generator for decreasing the excitation of said pilot generator a predetermined amount when the difference in speeds of said motors is a predetermined amount thereby to cause said dynamoelectric machine to maintain the desired speed relationship of said motors.

5. A control system comprising in combination, a first electric motor, a second electric motor, means for producing a voltage approximately proportional to the speed of said first motor, a pilot generator having main and auxiliary field windings and driven by said second electric motor for producing a reference control voltage proportional to the speed of said second electric motor, means for varying the speed of said first motor comprising a dynamoelectric machine having a control field axis, means responsive to the difference of said voltages for producing a net excitation along said control axis thereby to cause said dynamoelectric machine to maintain a predetermined speed of said first motor relative to the speed of said second motor, an adjustable resistor for varying said second voltage, said resistor being calibrated so that said dynamoelectric machine tends to hold the speed of said first motor at a speed substantially higher than the desired operating speed, a tachometer generator driven by said first motor, a second tachometer generator driven by said second motor, an amplifying device responsive to the voltages of said tachometer generators for supplying a voltage to said auxiliary field winding, and means for adjusting said voltages relative to each other so that the excitation of said pilot generator is reduced when the speeds of said motors are in predetermined relationship with each other thereby to cause said dynamoelectric machine to maintain a predetermined speed relationship between said motors.

6. A control system comprising in combination, a first electric motor, a second electric motor, means for maintaining a predetermined speed relationship between said motors comprising a pilot generator driven by said second motor for producing a control voltage proportional to the speed of said second motor, said generator having main and auxiliary field windings, means for producing a voltage proportional to the speed of said first motor and an armature reaction excited dynamoeletric machine responsive to said voltages for controlling the speed of said first motor, means for varying the voltage supplied to said armature reaction machine so that said machine tends to hold the speed of said first motor at a value substantially higher than the desired value, a first tachometer generator driven by said first motor, a second tachometer generator driven by said second motor, an electric valve amplifier responsive to said voltages for supplying said auxiliary field to reduce the excitation of said pilot generator and thereby recalibrate said speed relationship retaining means, and means for varying the voltages supplied to said amplifier so that speed relationship maintaining means is recalibrated when the speeds of said motors are in the desired relationship and operates to maintain said desired relationship.

7. A control system comprising in combination, a first electric motor, a pilot generator driven by said motor for producing a control voltage proportional to speed, said generator having a field winding, a second electric motor, means for producing a voltage proportional to the speed of said second motor, means for controlling the speed of said second motor comprising a dynamoelectric machine having a control field axis, a starting control device and means controlled thereby for energizing said generator field winding, means responsive to said voltages for controlling said dynamoelectric machine to accelerate said second motor to a speed having a predetermined relationship to the speed of said first motor, a stop control device and means controlled thereby for deenergizing said generator field winding thereby to cause said dynamoelectric machine to decelerate and reverse the direction of rotation of said second motor, and limit switch means actuated by said second motor for terminating the reverse operation of said second motor.

8. A control system comprising in combination, a first electric motor, a second electric motor, means for producing a voltage proportional to the speed of said first motor comprising a pilot generator driven by said first motor and provided with a field winding, means for producing a voltage proportional to the speed of said second motor, means for controlling the speed of said second motor comprising an armature excited dynamoelectric machine provided with a control field winding connected to be responsive to the difference of said voltages, a start control device and means responsive to actuation of said device for energizing said generator field winding to effect acceleration of said second motor to a speed having a predetermined relationship to the speed of said first motor, a stop control device, means responsive to actuation of said stop control device for deenergizing said generator field to effect deceleration of said second motor and for applying a voltage of reverse polarity to said control field winding to effect reverse rotation of said second motor, and limit switch mechanism operated by said second motor for terminating said reverse rotation.

9. A control system comprising in combination, a first electric motor, a pilot generator driven thereby for producing a control voltage proportional to its speed, said generator being provided with a control field winding, a second electric motor, means for producing a voltage proportional to the speed of said second motor, means for controlling the speed of said second motor comprising a dynamoelectric machine provided with a control field winding connected to be responsive to the difference of said voltages, a start control switching device, means responsive to actuation of said switching device energizing said generator field winding to effect acceleration of said second motor, a stop control device, means responsive to actuation of said stop control device for deenergizing said generator field winding to effect deceleration of said motor, and means responsive to the armature current of said second motor for producing a component of excitation opposing the excitation of said control field winding thereby to limit the armature current of said second motor during acceleration and deceleration.

10. A control system comprising in combination, a first electric motor, a pilot generator driven by said motor for producing a control voltage proportional to the speed of said motor, said generator being provided with a field winding, an adjustable voltage generator, and a second electric motor supplied therefrom, means for producing a control voltage proportional to the speed of said second motor, means for controlling the excitation of said generator comprising a dynamoelectric machine provided with a control field winding connected to be responsive to the difference of said voltages, a start control device and switching means controlled thereby for connecting said pilot generator field to a source of supply thereby to accelerate said second motor, a stop control device, switching means responsive to operation of said stop control device for deenergizing said pilot generator field winding thereby to effect deceleration of said second motor, and means responsive to the stopping operation of said second motor for applying a voltage to said control field winding thereby to cause said supply generator to apply a voltage to said second motor to provide rapid acceleration of said second motor in response to the next operation of said starting device.

11. A control system comprising in combination, a first electric motor, a second electric motor, coarse control means for maintaining a predetermined speed relationship between the speeds of said motors comprising a pilot generator driven by said first motor for producing a voltage proportional to the speed thereof, means for producing a voltage proportional to the speed of said second motor and a dynamoelectric machine having a control field winding connected to be energized by said voltages for controlling the speed of said second motor, a rheostat for varying the relative values of said voltages to control the relative speeds of said motors, said rheostat being calibrated so as to cause said dynamoelectric machine to maintain the speed of said element driving motor at a value substantially higher than the desired value, and fine control means comprising a pilot tachometer generator driven by said first motor, a second pilot tachometer generator driven by said second motor, means responsive to a predetermined relationship of said tachometer generator voltages for reducing the voltage of said first mentioned pilot generator so that said dynamoelectric machine maintains the desired speed relationship between said motors, a rheostat for varying the relationship of said tachometer generator voltages thereby to adjust the relative speeds of said motors, and a second rheostat for further modifying said voltages.

MARTIN A. EDWARDS.
FRANCIS MOHLER.

CERTIFICATE OF CORRECTION.

Patent No. 2,298,877.

October 13, 1942.

MARTIN A. EDWARDS, ET AL.

It is hereby certified that error appears in the printed specification of the above numbered patent requiring correction as follows: Page 1, second column, line 49, after "accuracy" insert --of one-tenth--; line 52, for "accuravy" read --accuracy--; page 5, first column, line 33, for "$38_o$" read --$38_e$--; and that the said Letters Patent should be read with this correction therein that the same may conform to the record of the case in the Patent Office.

Signed and sealed this 24th day of November, A. D. 1942.

Henry Van Arsdale,
Acting Commissioner of Patents.

(Seal)